Feb. 13, 1940.                W. H. HICKOK                2,189,985
                            ELECTRODE STRUCTURE
                            Filed Jan. 20, 1938

INVENTOR.
WILLARD HICKOK
BY
Charles McClair
ATTORNEY.

Patented Feb. 13, 1940

2,189,985

UNITED STATES PATENT OFFICE 2,189,985

ELECTRODE STRUCTURE

Willard H. Hickok, Bloomfield, N. J., assignor, by mesne assignments, to Radio Corporation of America, New York, N. Y., a corporation of Delaware Application January 20, 1938, Serial No. 185,795

3 Claims. (Cl. 250—153)

My invention relates to improvements in cathode ray television transmitting tubes, and particularly to an improved photo-sensitive electrode for use in such tubes and the method of making such electrode.

In the usual form of cathode ray transmitting tube, light from an object of which a picture is to be transmitted is projected through an optically uniform window of the tube and focused on the front surface of a target or mosaic electrode consisting in general of a thin transparent insulating sheet, such as mica, with a great number of discrete photoelectrically sensitive elements on the front and a signal electrode comprising an electrically conductive coating on the opposite surface, the front or illuminated surface being scanned by a cathode ray beam to generate picture signals which are collected from the metallic coating. These picture signals which are electrical impulses representative of the light values of elemental areas of the image, may be amplified and applied to a cathode ray type of receiving tube to produce a visible reproduction of the image. Since television transmitting tubes of this type are designed to operate with a variety of lenses, the use of relatively short-focal length lenses make it necessary to locate the mosaic electrode in close proximity to the window in the envelope. It is also desirable to have the mosaic electrode symmetrically located with respect to the window and the walls of the tube to avoid non-uniform distribution of secondary electrons over the surface of the electrode. Furthermore, the window must be optically uniform and of sufficient mechanical strength to withstand the external atmospheric pressure. It is, therefore, desirable to make the window concave toward the mosaic electrode. With such a tube transmission of a sharply focused image with good contrast of light and shade is oftentimes difficult, the lack of sharp focus and good light and shade contrast of the primary optical image being particularly noticeable when a brilliant optical image is formed on the mosaic electrode.

An object of my invention is to provide an improved cathode ray transmitter in which better focus and contrast of the image transmitted can be obtained, particularly when the optical image is brilliant. Another object of my invention is to obtain better focus and contrast in a simple and inexpensive way without decreasing the intensity of the image to be transmitted.

In accordance with my invention I provide an insulating foundation for a mosaic electrode one surface of which is treated to prevent specular reflection, the treated surface having deposited thereon a multiplicity of photoelectrically sensitive elements and the untreated surface bearing a film or layer of metal or other electrical conductor to serve as the signal plate of the mosaic electrode.

It has been found that a portion of the light from an optical image, which is focused on the mosaic electrode is specularly reflected from the thin transparent mica sheet to the window and again reflected and focused by the window on the mosaic electrode, resulting in a secondary optical image being formed, on the photo-sensitive surface. In tubes of conventional form this image is usually inverted and of smaller size than the optical image which it is desired to transmit. The secondary image may, by similar reflections, form tertiary images which are not in register with the image to be transmitted thereby introducing further distortion in the recreated image at the receiver. In addition to forming the secondary and tertiary images part of the light forming the optical image is reflected by the metallic coating or signal electrode on the rear surface of the mosaic electrode assembly, which in many tubes is a coating of platinum or other metal, to the interior of the tube and reflected back to the mosaic electrode from some light reflecting object in the tube such as the concave window. Light reflection of this latter character is not altogether objectionable inasmuch as that portion of the light reflected from the metallic coating which strikes the photoelectrically sensitive elements on the front surface of the insulating sheet tends to reinforce the optical image being transmitted but the light which passes through the insulating sheet and continues to the tube window, reinforces the inverted optical image which is formed on the mosaic surface from the window, further interfering with the proper operation of the tube.

These and other objects, features, and advantages of my invention will appear from the following description taken in connection with the accompanying drawing in which.

Figure 1:
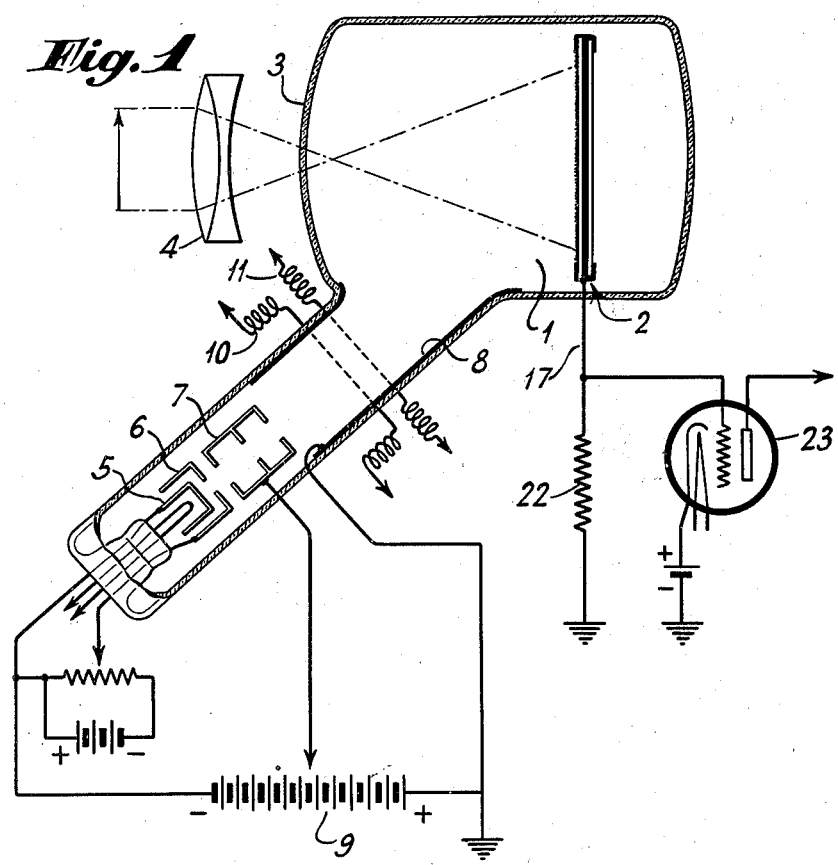
Figure 1 is a diagrammatic view illustrating one form of my television device.

In the illustrative embodiment of my invention shown in Figure 1 the tube comprises a highly evacuated glass envelope or bulb 1 of cylindrical shape with a tubular arm or neck section enclosing a conventional type electron gun. The bulb 1 encloses a flat target or mosaic electrode 2 symmetrically positioned in the envelope so that its front surface may be scanned by a beam of electrons from the electron gun and also may have projected upon it the optical image to be transmitted. Since the image is produced by light from an object situated outside the tube, a portion of the tube such as the transparent window 3 which is optically uniform and preferably of spherical shape so that it may better withstand atmospheric pressure, is provided so that the image to be transmitted may be projected upon the electrode 2 with the minimum of distortion by the lens 4.

The electron gun assembly is of the conventional type, and comprises a cathode 5 from which an electron stream may be drawn, a control electrode 6 connected to the usual biasing battery, and a first anode 7 maintained positive with respect to the cathode 5. The electron stream leaving the first anode 7 is accelerated and concentrated into an electron scanning beam focused on the front surface of the target 2 by a second anode 8, which is preferably a conductive coating on the surface of the envelope 1 near the neck of the bulb but removed from that portion through which is projected the optical image to be transmitted. The first anode 7 and the second anode 8 are maintained at the desired positive potentials with respect to the cathode 5 by a battery 9. Conventional deflection means such as deflection coils 10 and 11 may be used to sweep the beam in a horizontal and vertical plane, respectively, to scan the mosaic electrode. It is obvious that conventional electrostatic deflection-plates may be substituted for either one or both of the deflection coils if desired.

Figure 2:
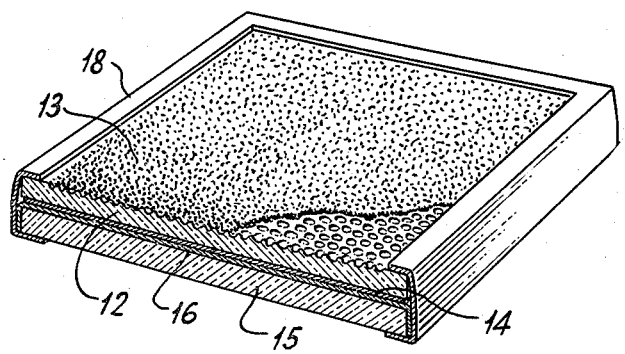
Figure 2 is a perspective view partially in section showing in enlarged detail a portion of the electrode structure shown in Figure 1.

In accordance with my invention the photosensitive mosaic of individual mutually separated and insulated photosensitive particles is, as best shown in Figure 2, formed on one side of a thin transparent sheet of insulation, such as mica, which has been mechanically roughened as by sand blasting to reduce specular reflection but which is still substantially translucent. The term "sand blasting" is used to mean a mechanical roughening of the mica which produces a surface on the mica mechanically and optically similar to that produced by sand blasting and includes such roughening methods of blasting with an abrasive. The side of the sheet of mica opposite the mechanically roughened surface is covered with a film of metal such as platinum or other material having high electrical conductivity and a high coefficient of light reflection. This film of metal is in capacitive relationship with the mosaic particles and serves as an electrode for collecting the picture signals.

In making the mosaic electrode 2, I select a sheet of mica 12 of the desired area having a uniform thickness of approximately .002" thus obtaining a sheet of insulation sufficiently thin and of sufficiently uniform insulating properties over its exposed surface without sacrificing mechanical strength and other desired properties. Mica is a specularly reflective material and I have found that the specular reflection from the surface of the mica which bears the mosaic of photosensitive particles can be substantially eliminated and at the same time obtain a surface which is particularly suitable as a support for the individual particles by mechanically roughening this surface by blasting the mica with small particles of carborundum directed upon the surface at high velocity by a jet of air. Carborundum particles which have been graded as to size by sifting through a 270 mesh screen are satisfactory for the purpose. The mica sheet is placed on a foundation having a plane surface, such as a smooth flat sheet of metal or glass, held in place by removable adhesive tape which over-laps the mica sheet for a distance of approximately 1 mm. around the edges, and sand blasted by holding the foundation so that the mica sheet is inclined at an angle of approximately 60° to the jet of air which blows the fine carborundum particles against the surface of the mica. The degree or uniformity of the mechanical roughening of the mica is not critical but I have made satisfactory tubes wherein the white light transmission has been decreased 30% by the sand blasting operation. Care should, however, be exercised in supporting the mica sheet on a plane foundation so that the carborundum particles have substantially the same effect over all the surface of the mica.

The next step in preparing the electrode is to coat the roughened side of the mica sheet with finely divided silver oxide which is reduced to provide a surface of individually separated silver particles 13 which are subsequently oxidized and sensitized with caesium during the evacuating process. Such a process for forming, oxidizing, and sensitizing the silver particles which form the light sensitive structure is disclosed by S. F. Essig in his U. S. Patent 2,065,570.

The next step in preparing the electrode is to deposit on the opposite side of the sheet from the side which is mechanically roughened and bears the individually separated silver particles, a uniform coating of platinum or other highly reflective electrically conducting material 14 which serves as a signal plate for the mosaic electrode 2.

To strengthen the thin mica sheet 12, which carries the individual silver particles on the mechanically roughened side and the electrically conducting coating such as platinum on the opposite side and which is inherently weak because of its thinness I prefer to use a relatively thick backing sheet 15 also preferably of mica and of the same size as the sheet 12. On the side of the backing sheet facing the platinum coating 14, I provide a conductive coating 16 also preferably of metal such as platinum in good electrical contact with the platinum coating 14 to assure minimum electrical resistance between various points on the coating 14 and the external circuit which is connected through the lead 17 to a frame or clip member 18 which grips the edges of the two micas and which is in electrical contact with the coating 16.

Referring again to Figure 2 the frame or clip member 18, which is in electrical contact with the conductive coating or signal electrode 14 is connected through the impedance 22 to ground and the second anode 8, and in operation the signal current flow in this circuit produces a voltage drop across the impedance 22 which may be impressed on the input of a translating device 23, further amplified, and applied to a transmitting network in a manner well known to the art.

The above examples illustrative of my invention are considered in connection with light sensitive structure of the mosaic type which utilize a large number of individually insulated particles each of which is electrically and mechanically separated one from the other. My invention is particularly, but not exclusively, directed to this type wherein a portion of the optical image projected on the particles may pass through the interstices and be reflected back to the particles through the mechanically roughened surface of the mica sheet. Such reflection tends to reinforce the optical image projected on the mosaic surface by light which passes through the interstices between the particles but this light cannot be specularly reflected to the window 3 where it might again be reflected as an inverted secondary image on the mosaic electrode because of the light dispersing action of the roughened mica surface.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

I claim:

1. A cathode ray television transmitting tube comprising an envelope portions of which are light reflecting having a light transmitting portion concave on its inner surface for the transmission of an optical image, an electrode assembly including a sheet of insulating material having a sand blasted surface exposed to said concave light transmitting portion, a light sensitive structure of mutually separated metallic particles on said surface and an electrically conductive coating on the opposite side of said sheet of insulating material.

2. A cathode ray television transmitting tube comprising an envelope with a window concave on its inner surface, and an electrode structure optically exposed to said window comprising a transparent sheet of mica having a sand blasted surface, a mosaic of individual photosensitive particles on said sand blasted surface and a light reflecting electrically conductive coating on the surface of the mica opposite the sand blasted surface.

3. A photosensitive electrode for a television transmitting tube comprising a thin sheet of mica having a sand blasted surface, a mosaic of mutually separated photosensitive particles on said sand blasted surface and an electrically conductive light reflective coating on the side of said sheet of mica opposite said sand blasted surface.

WILLARD H. HICKOK.